June 25, 1963 E. W. VREDENBURG 3,095,019
FEED MACHINE FOR BAGS
Filed March 8, 1960 5 Sheets-Sheet 1
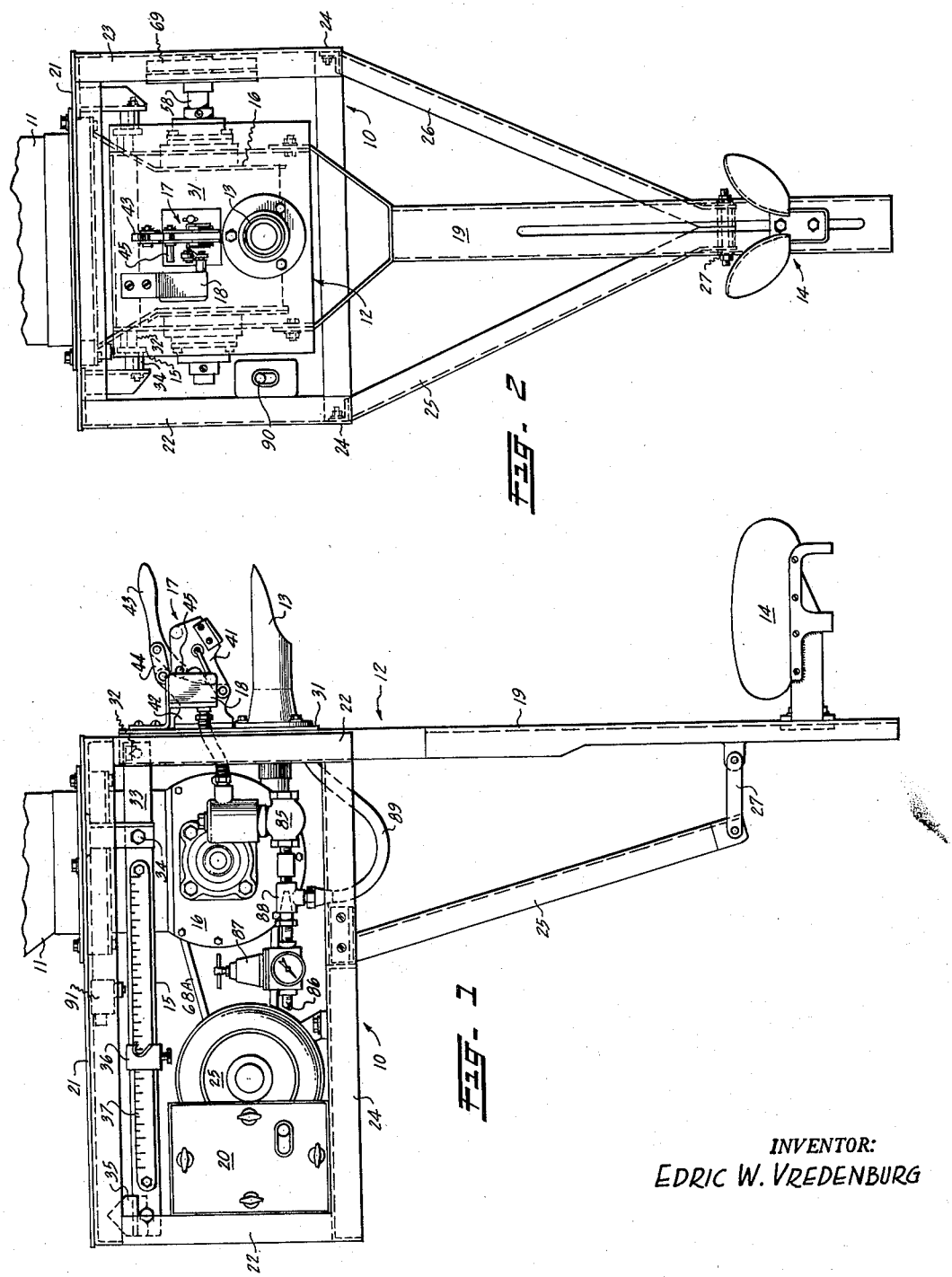
INVENTOR:
EDRIC W. VREDENBURG June 25, 1963 E. W. VREDENBURG 3,095,019
FEED MACHINE FOR BAGS
Filed March 8, 1960 5 Sheets-Sheet 2

INVENTOR:
EDRIC W. VREDENBURG

June 25, 1963  E. W. VREDENBURG  3,095,019
FEED MACHINE FOR BAGS
Filed March 8, 1960  5 Sheets-Sheet 3
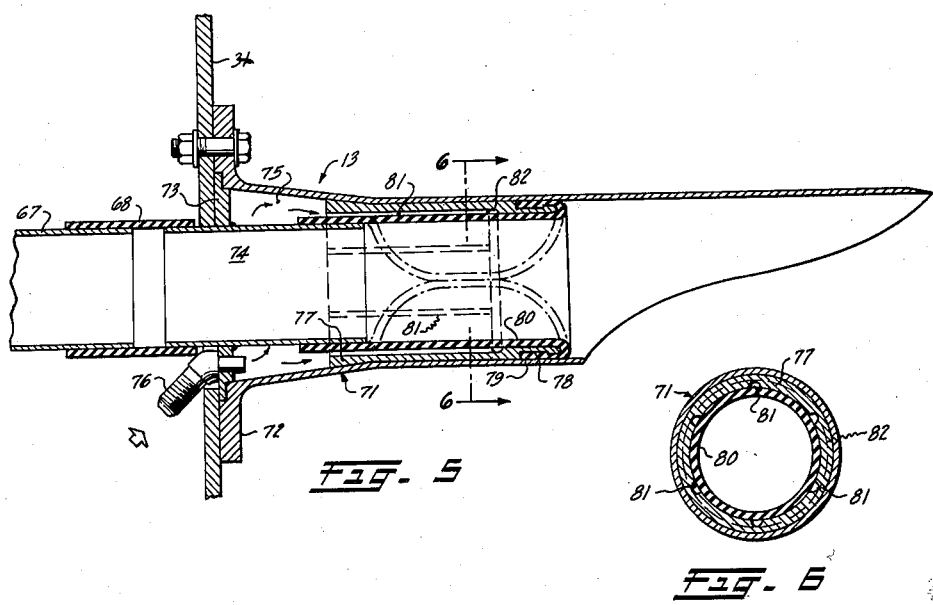
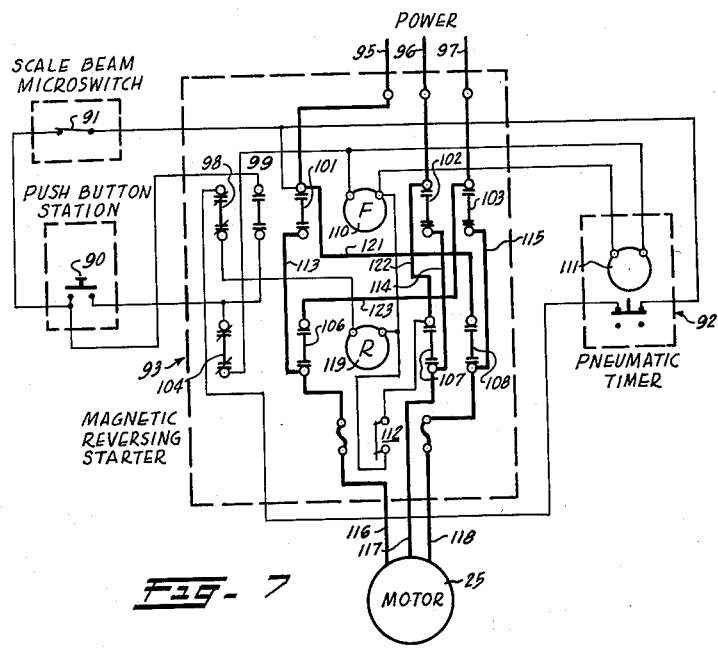
INVENTOR:
EDRIC W. VREDENBURG June 25, 1963 E. W. VREDENBURG 3,095,019
FEED MACHINE FOR BAGS
Filed March 8, 1960 5 Sheets-Sheet 4
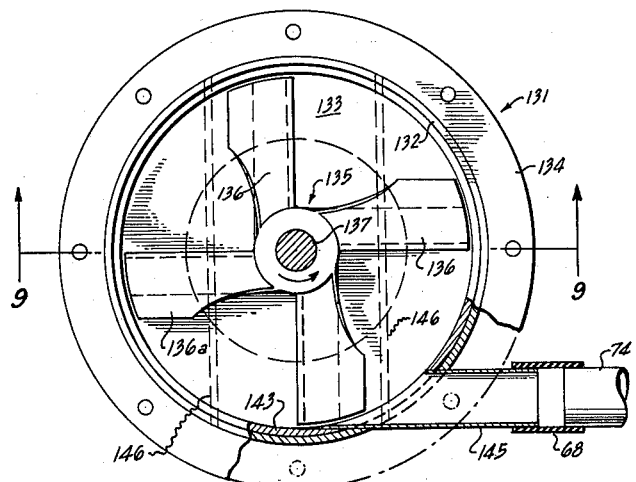
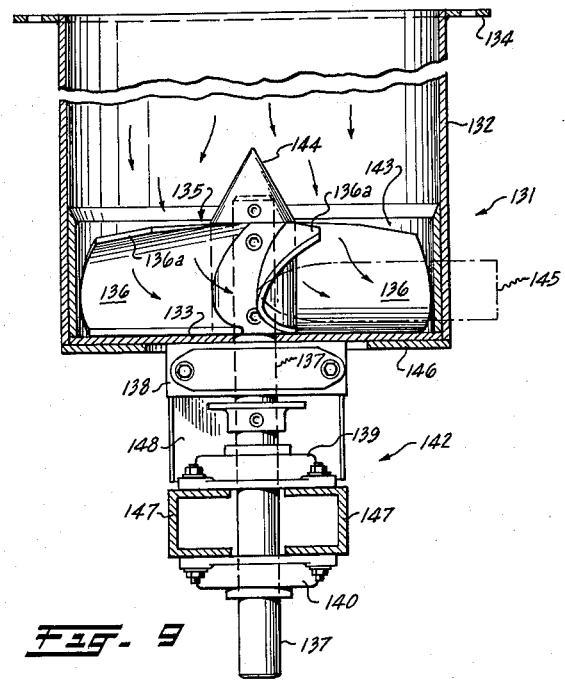
INVENTOR:
EDRIC W. VREDENBURG

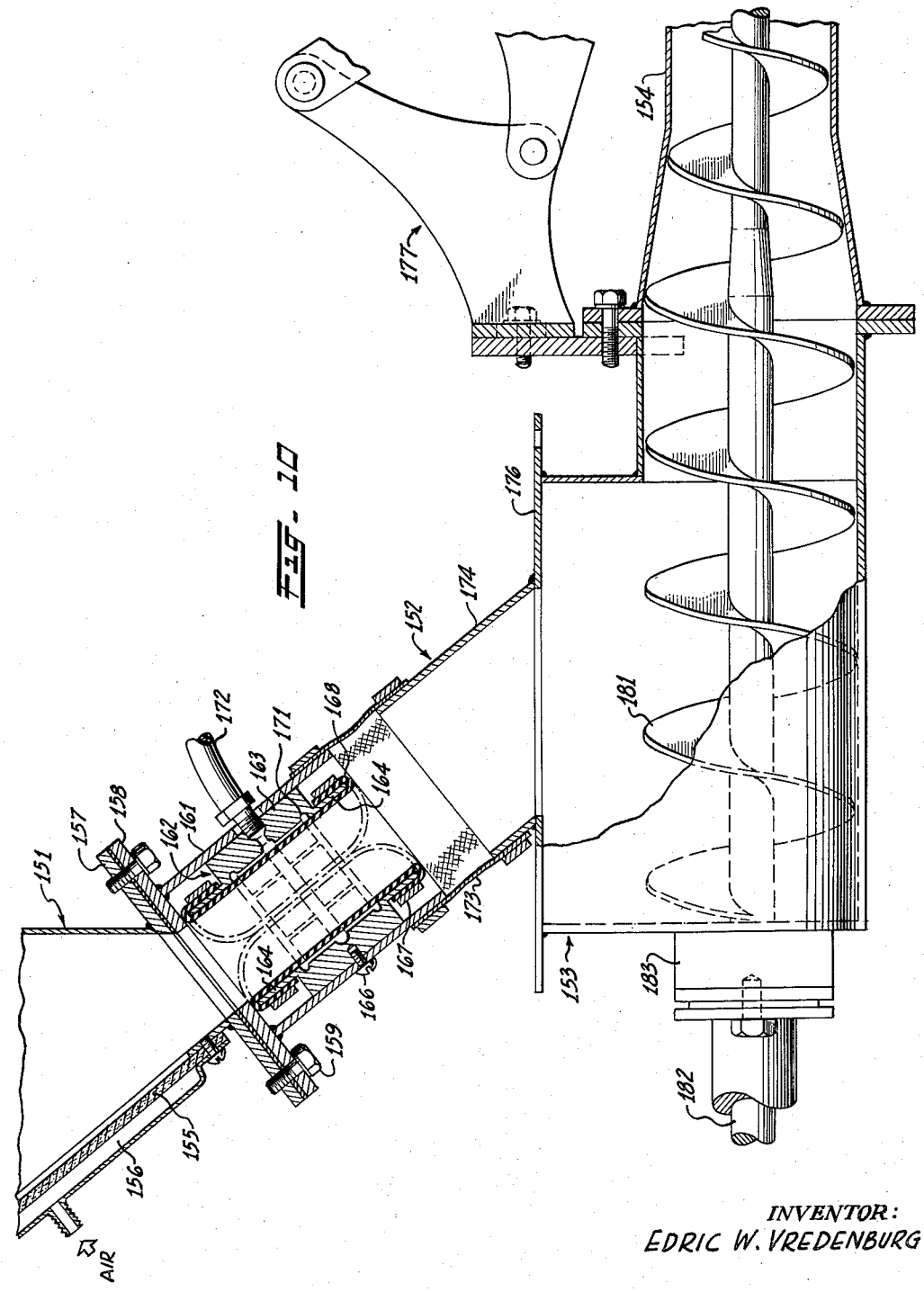

United States Patent Office 3,095,019
Patented June 25, 1963

3,095,019
FEED MACHINE FOR BAGS
Edric W. Vredenburg, Oakland, Calif., assignor to St. Regis Paper Company, New York, N.Y., a corporation of New York
Filed Mar. 8, 1960, Ser. No. 13,520
1 Claim. (Cl. 141—68)

This invention pertains to an improved container-filling and material-weighing machine which can be utilized to feed a predetermined amount of a powdered or granular material into a container of the type known in the art as a "valved bag."

The methods of manufacture of various materials result in their production in a highly aerated state. For example, many insecticides are produced by grinding and/or mixing the solid insecticide and an inert carrier in such equipment that the finely divided mixture is highly aerated. As a result the aerated product will occupy a space substantially larger than that required by its real bulk density. In packaging such a material, it has been necessary to work and shake the material violently to remove the entrained air. This made the packaging step slow and costly.

It is in general the object of this invention to provide a simple and improved machine for discharging a dry finely divided and highly aerated material from a bulk supply source through a rotary displacement mechanism which compacts and deaerates the material while discharging it into a positioned container or bag.

More particularly, it is the object of the present invention to provide a novel rotary displacement mechanism which has certain unique advantages adapted to filling bags with finely divided solid materials which are packed and accurately weighed simultaneously and which incorporates control features for instantaneous shut-off of material feed flow when the material delivered into the bag has reached a predetermined weight.

This invention also incorporates a valving mechanism of a new and improved design which provides for the positive opening and closing of a discharge outlet in a very simple yet positive manner.

These and other objects and advantages of the present invention will be apparent from the following description wherein the present preferred form of the invention is set forth. It is to be understood that the invention is not limited to that shown, since the invention as set forth in the claim may be embodied in other forms.

Figure 3:
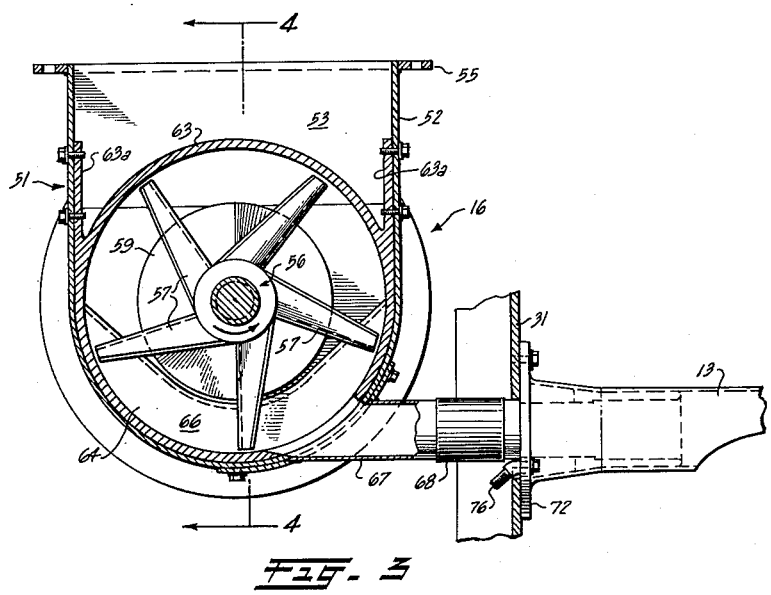
Figure 4:
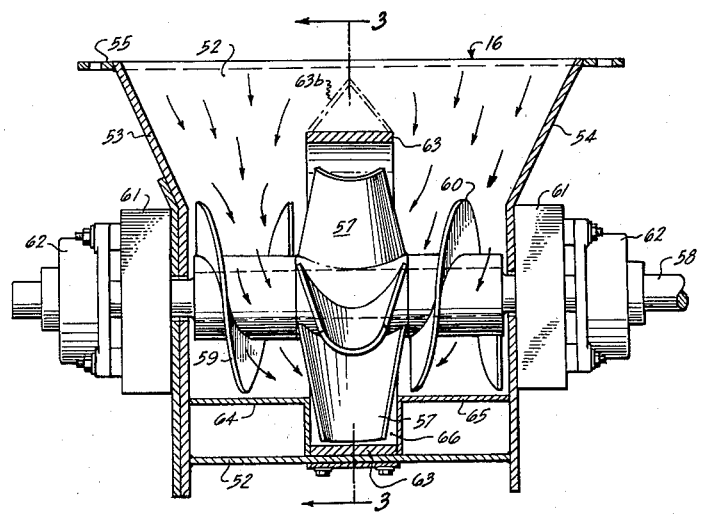

Referring to the drawings:
FIGURE 1 is a side elevational view of the assembled machine.
FIGURE 2 is a front elevational view of the machine shown in FIGURE 1.
FIGURE 3 is a vertical cross-sectional view of the rotary displacement feed mechanism incorporated in the machine taken along line 3—3 of FIGURE 4.
FIGURE 4 is a vertical transverse cross-section through the displacement mechanism illustrating the component parts in detail as viewed along line 4—4 of FIGURE 3.
FIGURE 5 is an enlarged longitudinal cross-sectional view of the flow-control valving means mounted in the delivery spout.
FIGURE 6 is a transverse section taken along the line 6—6 of FIGURE 5.
FIGURE 7 is a circuit diagram illustrating the method of controlling the operation of the rotary displacement mechanism.
FIGURE 8 is a top plan view illustrating a modified form of rotary feed mechanism shown partially in section.
FIGURE 9 is a vertical broken cross-section through the mechanism of FIGURE 8 taken on line 9—9.

FIGURE 10 is a side elevation partly in section through a modified form of the apparatus, showing another structure employing the novel valve.

Referring particularly to FIGURES 1 and 2 and by way of a general description, the machine includes a suitable supporting framework indicated generally at 10, made up of angle iron and other related structural elements and attached to a feed hopper 11. A weighing frame, indicated generally at 12, is supported on the framework 10. The frame includes a discharge outlet or nozzle 13, bag support means 14 and scale beams 15. Rotary displacement mechanism to deliver material from the hopper 11 to the nozzle 13 is indicated at 16. Bag-clamping toggle mechanism 17 is provided to clamp a valve-bag on the nozzle 13. An electrical circuit control panel box 20 is mounted toward the rear of frame 10.

The upper portion of framework 10 incorporates a top plate 21 attached directly to the feed hopper 11. The top plate supports the rotary displacement mechanism 16, which will be discussed in more detail in a subsequent part of this specification. Pairs of depending legs 22 and 23 are securely fastened to the upper portion of the framework 10 and carry horizontal members 24 which provide a support for motor 25. In addition, horizontal members 24 have depending therefrom two angularly disposed elements 25 and 26 and links 27 for lateral guidance of the bottom portion of the weighing frame 12 and bag support means 14.

The weighing frame 12 includes a vertically disposed front plate 31 supported on pivot blocks 32. The plate 31 is attached to a pair of spaced rearwardly extending scale beams 33. These are supported intermediate their ends on pivot supports 34. The scale beams have counterbalance weights 35 at one end while an auxiliary vernier weight 36 is adjustably mounted on a scale 37 which is in turn carried on one of the beams 33. Mounted on the front of plate 31 are the discharge nozzle 13, bag-clamping toggle mechanism 17, and a microswitch 18 for a purpose to be described later. A depending member 19 is attached to the plate 31 and is supported by links 27 and arms 25 and 26 as a part of the weighing frame 12. A bag support or chair 14 is mounted on member 19; the bag support may be readily adjusted vertically so that bags or containers of various heights may be accommodated.

The bag clamping mechanism 17 comprises a clamping member 41 pivotally mounted on plate 42 attached to the front plate 31. The clamping member is adapted to be raised and lowered between a bag-releasing position (as shown in FIGURE 1) and a bag-retaining position by movement of handle 43 and link 44. The handle 43, link 44 and member 41 are so pivoted with respect to each other that a toggle mechanism is formed. Thus movement of the handle 43 in an upward direction causes the member 41 to rotate downwardly to clamp a valved bag or container against the top surface of nozzle 13 to retain the bag during filling of the bag. Downward or reverse movement of the handle 43 releases the clamping pressure and permits removal of a filled bag or container. A projection 45 on the clamping member 41 functions to open and close microswitch 18 which controls operation of a material flow control valve in the discharge nozzle 13, which will be explained later.

The material-feeding mechanism 16, one embodiment of which is illustrated in FIGURES 3 and 4, includes a casing or housing 51 having a generally U-shaped plate 52, vertical side plates 53 and 54, and mounting flange 55 joined together to form a substantially unitary receptacle to receive finely divided aerated material from the hopper 11. A rotatable compacter-impeller assembly 56, having a number of radial generally U-shaped, tapered blades 57, is centrally located on a drive shaft 58. To feed material into the assembly 56 a pair of oppositely threaded helical flight members or propellers 59 and 60 are provided on opposite sides of the assembly 56. Each flight member extends for about 360°.

The ends of shaft 58 pass through the side plates 53 and 54 and stuffing boxes 61 to suitable journals 62. A circular wear-ring 63 having upwardly extending flanges 63a is replaceably fastened within the casing to prevent damage to the U-shaped section 52 of housing 51 which would otherwise be caused by the centrifugal erosive force and consequent abrasion from the material being impelled therethrough. A deflector element 63b may be provided above ring 63 if required to facilitate the flow of certain materials into the assembly 56. Formed L-shaped guide elements 64 and 65 are situated at the bottom of housing 51 and in conjunction with wear-ring 63 constitute a channel 66 which opens into tube 67 to provide an outlet passage for the material being handled.

When the machine is in operation, a pulley on motor 25 drives assembly 56 by a belt 68a passed over pulley 69 on drive shaft 58. A flexible connection 68 of rubber or the like connects tube 67 to the inner end of discharge outlet 13, as will be seen. Because of this design, the material handled is positively driven from the upper portion of receptable 51 into the channel 66, through tube 67 and out the delivery spout 13 into the positioned bag or container.

Material fed from the hopper 11 into receptacle 51 is driven by oppositely threaded flights 59 and 60 into the assembly 56. Because of the U-shape and taper of the blades 57, the material is forced outwardly by centrifugal force. At the same time, the taper of the blades forces the material into a more compact state, thus deaerating the loose particles into a more densified mass until finally it is driven into the outlet passage as a comparatively air free mass, to be advantageously packed into a positioned bag. As a result, material discharged into the bag is so air free that the filling operation is complete when the desired weight of material is in the bag. Thus the bag-filling operation is simplified and the speed of filling greatly increased. It should be noted that the blades are of a larger area at their inner ends, tapering toward their tips. This relationship serves to effect compaction and deaeration of the material.

FIGURES 5 and 6 depict in detail the discharge outlet or nozzle assembly 13 which comprises a valve housing 71 having an outwardly flaring rearward section terminating in a mounting flange 72 which is bolted to the front plate 31 of the weighing frame. An intermediate disc member 73, affixed as by welding to a tubular section 74, cooperates with housing 71 to form an air-tight chamber 75. Disc 73 also carries a fitting 76 to provide for attachment of a flexible air hose to permit operation of the flow-control valve. An inner sleeve 77 precisely fits the interior bore of housing 71 and is provided with an annular groove 78. The enlarged end 79 of a flexible tubular valve element 80 is extended over the outer end of sleeve 77 and is held by groove 78 against the housing. The opposite or inner end of valve element 80 is tightly fitted on tube 74. A number of longitudinal grooves 81 are provided in sleeve 77 to allow the passage of air from chamber 75 to an annular groove 82 cut into the inner surface of sleeve 77 at its forward end. Thus, when fluid pressure is applied through fitting 76, the valve element 80 will be inflated and so moved into the position indicated by the broken lines. In this position, the valve element effectively seals off passage of material through the discharge outlet. The valve element is moved in separate areas away from the sleeve 77, each separate area abutting each other area to provide a tight seal. Conversely, when the pressure in chamber 75 is released and preferably is reduced below atmospheric, the valve is immediately flexed to a full-open position as shown in solid lines, whereby there is no impedance to the flow of material.

The operation of the machine and additional details of its construction will become apparent from a consideration of the following further description. With a bag placed with its valve over the discharge nozzle 13 and the bottom portion of the bag set into the bag chair 14, the bag-clamping mechanism 17 is operated to secure the bag in position. Microswitch 18 is operated by the movement of clamping member 41 and projection 45 thereon. The operation of the microswitch 18 opens solenoid valve 85 to the atmosphere permitting air to flow from pressure line 86 through regulating valve 87 and ejector 88. This creates a vacuum or suction in flexible air hose 89, causing the valve element 80 to deflate to a full or completely open position to allow free flow of material from the rotary displacement mechanism 16 through the discharge nozzle and into the bag. The motor 25 is normally controlled by a starter button 90 mounted on the supporting framework 10 so the operator is able to clamp the bag in receiving position on the spout and to open the discharge valve prior to initiating action of the displacement mechanism. However, if desired, simultaneous operation of both the valve and the motor can be controlled by microswitch 18 or, conversely, the closing of valve 80 and stopping of motor 25 can be controlled through the action of a microswitch 91 (FIGURE 1). This switch is mounted on the fixed frame in a position to be engaged by the scale beam.

A modified form of material-feeding mechanism is shown in FIGURES 8 and 9. In this embodiment, a substantially unitary receptacle 131 is fabricated, as by welding, of a cylindrical outer casing 132, a bottom plate 133 and an upper mounting flange 134. A horizontally disposed rotatable centrifugal assembly 135, has a number of generally U-shaped, tapered blades 136 extending radially. The assembly is centrally located in the lower interior of receptacle 131 and is mounted near the upper end of a vertical drive shaft 137. The shaft passes down through a hole in bottom plate 133 and stuffing box 138 to a pair of journal boxes 139 and 140 which are affixed to a supporting structure indicated generally at 142. A replaceable wear-ring member 143 having an outer diameter equal to the inner diameter of casing 132 is positioned at the bottom of receptacle 131 surrounding the centrifugal assembly 135 to prevent damage to the casing 132 by the erosive action of the centrifugally driven material. A cone-shaped deflector 144 is mounted on the top extremity of drive shaft 137 to facilitate the flow of material downwardly into the compacter assembly. An outlet tube 145 is provided for the discharge of material out of receptacle 131 through flexible connection 68 and on into the discharge spout 13, not shown in this view.

The support structure 142 consists of an upper annular plate 146 and a transversely positioned beam comprising two channel members 147 held in spaced parallel relationship by a pair of vertically disposed arcuate plate members 148 to provide a rigid support for journal boxes 139 and 140 and drive shaft 137. Thus, the upper plate 146 may be fastened to bottom plate 133 of receptacle 131 and a suitable pulley (not shown) mounted on the lower end of vertical drive shaft 137 to provide for powered rotation of the centrifugal assembly 135.

The blades 136 are shaped with an overhang portion 136a at the top of the U-shaped section. This serves to scoop out or undermine the finely divided aerated material fed by gravity from the hopper, forcing or driving it into the narrower outer end of each blade, with consequent compression and deaeration of the material. This compacting and deaeration is effected by the radially tapered U-shape of each blade; the material is forced by centrifugal acceleration toward the narrower section at the outer end of the blade. Thus the material impelled through outlet tube 145 through the discharge nozzle 13 to the bag is a comparatively dense mass and is readily packed in a bag.

When the bag has been sufficiently filled with the desired quantity of material, the weight of the bag and its contents will tilt the scale beams sufficiently to operate microswitch 91 mounted on framework 10 (see FIGURE 1). This will break the flow of current to the motor driving the displacement mechanism 16, thus stopping the positive flow of material to the nozzle. The clamping member is then moved to the released position, thus inactivating the solenoid and closing valve 85 and immediately directing air pressure through flexible tube 89 to inflate and close valve means 80 and so prevent any further flow of material, whereupon the filled bag may be removed from the machine.

The circuit employed to control the operation of the rotary compacter-impeller assembly is schematically illustrated in FIGURE 7. The system includes a three-phase power source, push-button control switch 90, scale beam cut-off microswitch 91, pneumatic timer 92, magnetic reversing starter 93 and the compacter-impeller driving motor 25.

After a bag has been clamped in position on the delivery spout 13, valve 80 is automatically flexed to full open position and the machine is then ready for operation. The operator then presses starter button 90 and a control circuit is temporarily completed from power line 95 through normally closed microswitch 91, push button 90 and normally closed contactor 104 to coil 110 in the magnetic starter to solenoid coil 111 in the pneumatic timer and back through overload circuit breaker 112 to neutral power line 96. Current flow through coil 110 opens contactor 98 and closes contactor 99 to complete a holding circuit for coils 110 and 111 through normally closed contactor 104. Energization of coil 110 also closes contactors 101, 102 and 103 to complete the power circuit througth connections 113, 114 and 115 to motor leads 116, 117 and 118 to supply forward or positive current to motor 25 for driving the compacter-impeller assembly with a resultant flow of material to the positioned bag through the filler nozzle.

When the weight of the bag and its contents reaches a predetermined amount, tilting of the scale beam operates microswitch 91 to open the previously mentioned holding circuit from line 95 through contactors 99 and 104, thus deenergizing coil 110 and returning contactor 98 to its normally closed position and opening contactors 99, 101, 102 and 103. Solenoid coil 111 in the pneumatic timer is deenergized simultaneously starting the delayed timing action even though the timer contacts remain temporarily closed, allowing current to flow from power line 95 through the "timer" contacts and contactor 98 to energize coil 119 in the magnetic starter, opening contactor 104 and closing contactors 106, 107 and 108 to connect power lines 95, 96 and 97, through by-pass connections 121, 122 and 123 to motor leads 118, 117 and 116 respectively. This supplies oppositely phased current to the motor with the resultant reversed magnetic field serving to effectively brake the motor to a prompt halt, thus stopping the rotation of the compacter-impeller assembly. The pneumatic timer is pre-set to hold for the required interval of time necessary to properly stop the motor's rotation.

When the timer contacts are disengaged the circuit passing through contactor 98 is broken, causing de-energization of coil 119, opening contactors 106, 107 and 108 and the entire magnetic reversing starter is de-energized to await a subsequent operation.

In FIGURE 10 I have shown a modified form of apparatus in which the material from hopper 151 passes through conduit 152 into a feeder mechanism generally indicated at 153 and including a nozzle 154 on which a valved-bag is mounted for filling. The hopper 151 and the conduit 152 are arranged to feed material into the feeder 153. The conduit is placed at an acute angle to the horizontal with the result that material from the hopper 151 slides down the conduit 152 into the feeder 153 and the weight of a long column of material is not placed on the feeder.

Hopper 151 includes a foraminous wall 155, one side of which is supplied with air from chamber 156. The air passing through the foraminous wall assists the material in sliding quickly out of the hopper 151 and through the conduit 152.

The bottom of the hopper includes a flange 157 to which is joined the flange 158 on the upper end of the conduit 152, the two flanges being secured together by studs 159. Secured to the flange 158 is a casing 161 in which is mounted a ring structure generally indicated at 162 and which includes a central portion 163 fitting the casing 161 snugly. The ring 162 has a flange 164 at each end thereof. The ring is secured in place by the screw 166. Mounted on the ring with its opposite ends fitting back over each of the flanges 164 and secured by clamps 167 is a tubular flexible member 168. The flexible element is spaced slightly from the interior of the ring, a plurality of grooves 171 facilitating the distribution of air from air supply pipe 172 between the ring and the flexible member. In one position, the flexible member is concentric with the interior of the ring. Upon application of fluid pressure, the flexible member is moved to a second position, being forced inwardly upon itself whereby the several portions of the flexible member engage one another to provide a closure.

The bottom of the tubular member 161 is joined as by a flexible canvas element 173 to an annular member 174 joined to the top of the feeder casing 176.

To move material into a bag a short screw conveyor flight 181 is mounted upon shaft 182, the latter being supported in the journal 183 mounted on an end of the casing 176. The screw extends forwardly into the nozzle 154 serving to move material into a bag positioned on the end of the nozzle and to which it is secured as by the clamping mechanism generally indicated at 177.

Operation of the screw flight feeder 181 and opening and closing of the valve are controlled off the scale beam in a well known manner. Usually, the valve is closed first and the motor operating the screw flight feeder is permitted a few revolutions to exhaust the material in the feeder 153.

Since the material is sliding from the hopper through the conduit 152 into the feeder 153 rather than falling down vertically, controlling the flow of material with the valve is an easy matter as compared with having to cut off the movement of a solidly packed column. Hence, the feeding at an acute angle provides a special advantage.

From the foregoing it will be apparent that I have devised and developed a novel, simple and improved method of handling, weighing and packaging granular material, which combines compacting, de-aerating and impelling operations together with positive control of material flow during delivery through a clamp-controlled valve located in an outlet nozzle to a prepositioned valved bag.

I claim:

In a bag-filling machine having a feed hopper with a downwardly directed mouth for feeding a finely divided aerated material and having a discharge nozzle for supporting an end of a bag into which said finely divided material is charged, means positioned immediately below said hopper for moving said finely divided material from the hopper to the nozzle and simultaneously deaerating said material, said means comprising:

(a) a housing having an open top in communication with the mouth of said feed hopper;
(b) a rotor horizontally journalled at the ends thereof in said housing for rotation about a horizontal axis;
(c) a plurality of generally U-shaped blades secured radially about said rotor, said blades terminating in upper edges which describe straight lines, said blades being directly secured to said rotor at points intermediate the ends of said rotor whereby finely divided material falling onto said rotor at points intermediate the ends thereof immediately falls into one of said blades, each of said blades having a uniform inward taper from the end at which said blade is secured to said rotor to the distal end thereof so as to provide a passageway of constantly diminishing width whereby to provide means for exerting constant compressive force on finely divided material in said troughs as said finely divided material is being forced toward the distal ends thereof by centrifugal force;

(d) a ring mounted coaxially about said rotor and closely enveloping the distal ends of said blades and fixed relative to said housing, said ring having upstanding flanges secured along either lowermost side thereof to form a trough;

(e) an opening in said ring in an area where said flanges are secured to said ring for removal of particulate material;

(f) means for rotating the rotor to force material out along each blade for compaction between the blade and said ring;

(g) and a screw flight mounted on said horizontal shaft on each side of the rotor, said flights each being oriented to feed material toward the said blades and toward the said trough formed by said ring and the said flanges therefor.

References Cited in the file of this patent

UNITED STATES PATENTS

| | | |
|---|---|---|
| 893,749 | Nichols | July 21, 1908 |
| 1,106,444 | Edison | Aug. 11, 1914 |
| 1,760,425 | Marsh | May 27, 1930 |
| 1,807,673 | Risser | June 2, 1931 |
| 1,880,895 | Dorrington et al. | Oct. 4, 1932 |
| 2,159,851 | Hicks | May 23, 1939 |
| 2,293,518 | Moyle | Aug. 18, 1942 |
| 2,568,536 | Beech | Sept. 18, 1951 |
| 2,687,244 | Peterson | Aug. 24, 1954 |
| 2,817,488 | Capell | Dec. 24, 1957 |
| 2,866,484 | Rose | Dec. 30, 1958 |
| 2,883,140 | Stafford | Apr. 21, 1959 |
| 2,898,078 | Stephenson et al. | Aug. 4, 1959 |
| 2,903,230 | Schachte | Sept. 8, 1959 |
| 2,955,796 | Tichenal | Oct. 11, 1960 |
| 2,964,285 | Bardet | Dec. 13, 1960 |